ABSTRACT OF THE DISCLOSURE

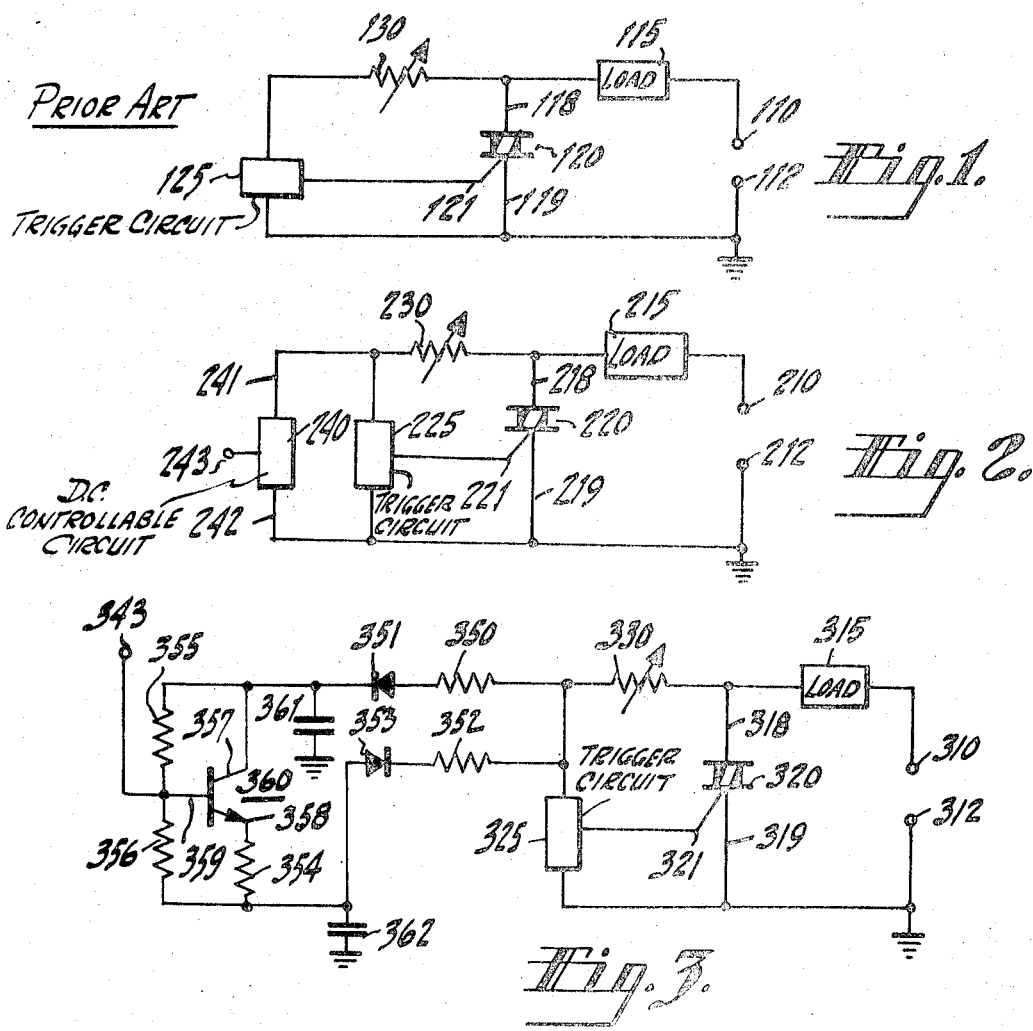
Fig. 1. (Prior Art)
Fig. 2.
Fig. 3.
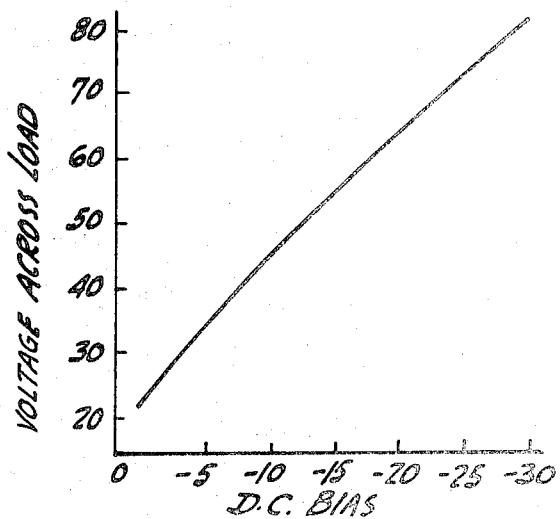
Fig. 4.
INVENTOR:
WILLIAM R. WALTERS
BY Edward J. Norton
ATTORNEY 3,551,787
THYRISTOR CONTROL CIRCUIT USING D.C. CONTROLLABLE TRIGGERING MEANS
William R. Walters, Medford, N.J., assignor to RCA Corporation, a corporation of Delaware
Filed Feb. 19, 1968, Ser. No. 706,517
Int. Cl. G05f 3/04
U.S. Cl. 323—22     3 Claims

A D.C. controllable circuit for directing the supply of A.C. power to a load. The main electrodes of a triac are connected in series with the load to a pair of input terminals to which a source of alternating current is connected. A time constant circuit for providing a triggering signal to the gate electrode of the triac is coupled to the main electrodes and gate electrode of the triac. The D.C. controllable circuit is coupled to the time constant circuit and is responsive to an external D.C. signal for controlling the generation of the triggering signal by the time constant circuit.

BACKGROUND OF THE INVENTION

Circuits for controlling the supply of A.C. power to a load are well known in the art. Generally these circuits operate on a phase control theory whereby the amount of power supplied to the load is determined by a point in time at which a thyristor element, such as a silicon controlled rectifier or a triac, is switched into its conducting state. Such circuits generally comprise an A.C. controlled time constant circuit for providing a triggering signal to the gate electrode of the thyristor. Often however, it is desirable to control the power supplied to a load in response to a D.C. signal externally supplied. For example, in servo control systems it is generally easier to handle a D.C. feedback signal as compared to an A.C. signal. Furthermore, if it is necessary to control the power supplied to a load from a remotely located control panel, or to provide a programmed control signal from an external source as in the case of a tape controlled machine, the ability to be able to do so with D.C. signals eliminates the need for high voltage A.C. wiring.

SUMMARY OF THE INVENTION

The main electrodes of a triac are connected in series with a load to a pair of input terminals to which a source of alternating current (A.C.) may be connected. A time constant circuit for providing a triggering signal to the gate electrode of the triac is coupled to the main electrodes and gate electrode of the triac. A D.C. controllable circuit is coupled to the time constant circuit and means provided for supplying an external D.C. signal to the controllable circuit.

The operation of the circuit is such that in the absence of a D.C. signal the triac will be triggered into conduction essentially as a function of the operation of the time constant circuit. The application of a D.C. signal will operate to vary the impedance of the D.C. controllable circuit which will in turn alter the point in time at which the time constant circuit provides the triggering signal to the gate electrode of the triac.

Accordingly, it is an object of the present invention to provide an improved D.C. controlled circuit for directing the supply of power to a load.

Another object is to provide a circuit for controlling the supply of A.C. power to a load in response to D.C. signals externally applied.

These as well as additional objects and advantages of the present invention will be more fully understood when the following description is read in conjunction with the accompanying figures in which:

FIG. 1 is representative of a phase control thyristor circuit as commonly known in the art;

FIG. 2 is representative of a control circuit in accordance with the present invention;

FIG. 3 is a circuit diagram in accordance with one embodiment of the present invention more specifically defining the circuit shown in FIG. 2; and FIG. 4 is a graphical analysis representing the performance of the circuit shown in FIG. 3.

DESCRIPTION OF A PREFERRED EMBODIMENT

Many applications exist where it is desirable to control the amount of power supplied to a load. FIG 1 is representative of a basic circuit, well known to those skilled in the art, which provides a means of accomplishing such a goal.

As shown in FIG 1, one terminal 110 of an alternating current (A.C.) supply is connected to one terminal of the load 115 to be supplied. The second terminal of the load 115 is connected to the first main electrode 118 of a triac 120. The second main electrode 119 of the triac 120 is then connected to the second terminal 112 of the alternating current supply, said second terminal 112 also serving as a point of reference potential. A triggering circuit 125 for providing a control signal to the gate electrode 121 of the triac 120 is coupled to the second main electrode 119, the gate electrode 121, and one terminal of a variable resistance device 130, e.g., a potentiometer. A second terminal of the variable resistance device 130 is connected to the first main electrode 118 of the triac 120. The triggering circuit 125 generally comprises at least one storage element, such as a capacitor, which stores energy as a function of the setting of the variable resistance 130, and discharges the stored energy at a desired instant of time to trigger the triac 120 into conduction. In addition, it may include a triggering diode or other like element, although recent technological advances have resulted in the availability of triacs having built-in triggering elements. One such example is the RCA 40431 which has a bi-lateral diode internal therewith.

In operation, the triggering circuit 125 charges as a function of the setting on the variable resistance element 130. During this charging period the triac 120 is in a non-conducting state and essentially exhibits the characteristics of an open circuit, and the voltage drop across the load 115 is negligible. At a predetermined point in time the triggering circuit 125 discharges to provide a signal to the gate electrode 121 of the triac to switch it into a conducting state thereby essentially reducing its effective impedance to zero. The total power supplied thereafter serves to operate the load 115 for the remaining portion of the A.C. half cycle. Variations in the amount of power supplied to the load 115 are accomplished by manually adjusting the variable resistance element 130 which results in an increase or decrease of the conduction angle, i.e., the point in time at which the triac 120 will be triggered into conduction.

In many instances it has proven desirable to automatically vary the supply of power to a remotely located load. For example, it may be desirable to be able to control the lighting in a studio via a remotely located control console; or it may be desirable to control the performance of a remotely located machine tool in response to a predetermined programmed input. As a further example, it may be desirable to control the performance of a motor driven load by feeding back an error signal derived from the load to the control circuit whereupon the power supplied thereto will be adjusted accordingly. This is particularly true in the case of a tape recorder where it is necessary that the tape move at a constant speed to insure efficient performance. In such a case a variation in the speed at which the tape is moving may be mechanically or electrically detected and means provided for converting this detection into an error signal to be fed back to the control circuit.

In the foregoing instances it is often desirable to accomplish the necessary control through the utilization of a D.C. signal. For example, it may be advantageous in the case of the first example, to avoid the introduction of A.C. lines into the control console. Furthermore, in the case of feeding back an error signal is has been found the D.C. systems are easier to operate and handle, and generally provide more efficient results.

FIG. 2 is representative of a circuit in accordance with the present invention. As shown, FIG. 2 incorporates the elements present in FIG. 1 and adds D.C. controllable circuit means 240; said circuit means 240 connected to one end terminal 241 to the junction of the triggering circuit 225 and the variable resistance element 230, and at the other end terminal 242 to the second main electrode 219 of the triac 220. A third terminal 243 is provided to which the external D.C. may be applied.

In operation the circuit means 240 exhibits an A.C. impedance as measured across terminals 241 and 242 which well vary as a function of the D.C. signal applied to the terminal 243; the value of this impedance will in turn vary the A.C. loading across the triggering circuit 225 and alter the point in time at which the triac 220 will be triggered into conduction. A discussion of FIG. 3, which more specifically illustrates one embodiment of the present invention, will aid in an understanding thereof.

In FIG. 3 a first resistor 350 and a first diode 351 are connected in series with the free end of resistor 350 connected to the junction of the triggering circuit 325 and the variable resistance element 330 and with the cathode of the diode 351 connected to collector 357 of an NPN transistor 360; the diode 351 being poled to conduct current toward the collector 357. A second resistor 352, a second diode 353, and a third resistor 354 are connected in series in the order named with the free end of resistor 352 connected to the junction of the triggering circuit 325 and the variable resistance element 330 and with the free end of resistor 353 connected to the emitter 358 of transistor 360; the diode 353 being poled to conduct current toward resistor 352. A fourth resistor 355 is connected at one end to collector 357 and at its other end to the base 359 of transistor 360. A fifth resistor 356 is connected at one end to the base 359 of the transistor 360 and at its other end to the anode of diode 353. A first capacitor 361 is connected at one end to the cathode of diode 351; its other end being connected to the point of reference potential 312. A second capacitor 362 is connected at one end to the anode of diode 353; its other end being connected to the point of reference potential 312. Terminal 343, to which an external D.C. signal may be applied, is connected to the base 359 of transistor 360.

It will be seen that the additional circuit means shown in FIG. 3 basically comprises two power supplies of opposite polarity, loaded with one transistor, i.e., resistor 350, diode 351, capacitor 361; and resistor 352, diode 353, capacitor 362; loaded with transistor 360. In operation, the externally supplied D.C. signal is applied to terminal 343 and serves as a bias for the transistor 360. The characteristics of the biasing signal operate to control the amount of loading the transistor 360 applies to the power supplies which in turn draw more or less A.C. current, which in turn determines the impedance of the circuit. As the impedance of the transistor 360 varies in response to variations in the applied D.C. signal, the amount of current supplied to the triggering circuit 325 is effected thereby resulting in a change in the point in time at which the triac 320 will be triggered into conduction. The circuit shown in FIG. 3 has proven effective as a servo control system for use with a tape recorder, where it is desirable that the maintenance of constant tape tension be automatically regulated. The variable resistance element 330 has proven effective as a means for regulating the maximum voltage drop which will occur across the load 315.

FIG. 4 is representative of the operation of the circuit shown in FIG. 3 with the variable resistance element 330 set to provide a maximum voltage drop across the load 315 of 80 volts with the circuit connected at terminals 310, 312 to a 120 volt A.C. source.

What is claimed is:
1. A D.C. controlled switching circuit comprising:
   (a) a triac having first and second main electrodes and a gate electrode;
   (b) first and second input terminals for connection to a source of alternating current, said second input terminal connected to said second main electrode;
   (c) a load connected on one end to said first input terminal and on its other end to said first main electrode;
   (d) a triggering circuit for providing a control signal to said triac, said circuit having first, second and third terminals, said second terminal connected to said second main electrode, said third terminal connected to said gate electrode;
   (e) a variable resistor connected between said first main electrode and said first terminal of said triggering circuit;
   (f) a transistor having base, emitter and collector electrodes;
   (g) first and second D.C. power supplies, said first power supply coupled between said first terminal and said triggering circuit and said collector, said second power supply coupled between said first terminal of said triggering circuit and said emitter; and
   (h) means for supplying D.C. signals to bias said transistor.

2. A D.C. controlled switching circuit comprising:
   (a) a triac having first and second main terminal electrodes and a gate electrode;
   (b) a pair of input terminals adapted for connection to a source of alternating current;
   (e) a load device;
   (d) means for connecting the first and second main terminal electrodes of the triac, said input terminals, and said load in series circuit;
   (e) a triggering circuit for providing a control signal to the gate electrode of said triac;
   (f) means including a variable resistance device for coupling said triggering circuit to said triac electrodes;
   (g) a transistor having base, emitter and collector electrodes;

(h) first and second D.C. power supplies,
said first power supply coupled between said collector and said triggering circuit,
said second power supply coupled between said emitter and said triggering circuit; and
(i) means by which the conduction level of said transistor can be determined.

3. The invention as set forth in cliam 2 wherein said first power supply further comprises a diode poled in a first direction relative to said triggering circuit and said second power supply further comprises a further diode poled in an opposite direction relative to said triggering circuit.

References Cited
UNITED STATES PATENTS

| | | | |
|---|---|---|---|
| 3,129,380 | 4/1964 | Lichowsky | 323—220X(SCR) |
| 3,366,861 | 1/1968 | Dudler | 318—345X |
| 3,438,023 | 4/1969 | Apitz | 307—252X |
| 3,443,204 | 5/1969 | Baker | 323—24 |

J D MILLER, Primary Examiner

A. D. PELLINEN, Assistant Examiner

U.S. Cl. X.R.

318—345; 323—24, 38